US012656868B2

(12) United States Patent
Gajiwala et al.

(10) Patent No.: US 12,656,868 B2
(45) Date of Patent: Jun. 16, 2026

(54) INFORMATION HANDLING SYSTEM HAPTIC FEEDBACK CLOSED LOOP RESPONSE

(71) Applicant: Dell Products L.P., Round Rock, TX (US)

(72) Inventors: Priyank J. Gajiwala, Austin, TX (US); Robert D. Hrehor, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 97 days.

(21) Appl. No.: 18/605,324

(22) Filed: Mar. 14, 2024

(65) Prior Publication Data

US 2025/0291417 A1      Sep. 18, 2025

(51) Int. Cl.
*G06F 3/01* (2006.01)
*G06F 3/0354* (2013.01)

(52) U.S. Cl.
CPC .......... *G06F 3/016* (2013.01); *G06F 3/03547* (2013.01)

(58) Field of Classification Search
None
See application file for complete search history.

(56) References Cited

U.S. PATENT DOCUMENTS

| | | | |
|---|---|---|---|
| 9,304,599 B2 | 4/2016 | Walline et al. | |
| 9,495,021 B2 | 11/2016 | Irani et al. | |
| 10,108,337 B2 | 10/2018 | Ligameri et al. | |
| 10,819,341 B2 | 10/2020 | Casparian et al. | |
| 10,860,112 B1 | 12/2020 | Knoppert et al. | |
| 11,157,047 B2 | 10/2021 | Seibert et al. | |
| 11,294,469 B2 | 4/2022 | Gajiwala et al. | |
| 11,301,053 B2 | 4/2022 | Gajiwala et al. | |
| 11,347,322 B2 | 5/2022 | Knoppert et al. | |
| 11,571,617 B2 | 2/2023 | Goh et al. | |
| 11,687,160 B2 * | 6/2023 | Zhao | G06F 3/03547 345/157 |
| 12,039,858 B2 * | 7/2024 | Richards | G08B 6/00 |
| 2010/0123588 A1 * | 5/2010 | Cruz Hernandez | G06F 3/015 340/407.1 |
| 2011/0075835 A1 * | 3/2011 | Hill | G06F 3/016 340/407.1 |
| 2016/0209922 A1 * | 7/2016 | Kim | G06F 3/016 |
| 2018/0078754 A1 * | 3/2018 | Perez | A61N 1/36034 |
| 2020/0139403 A1 * | 5/2020 | Palit | G05D 19/02 |
| 2023/0368206 A1 * | 11/2023 | Turgeman | G06F 21/54 |
| 2024/0008777 A1 * | 1/2024 | Fuchs | A61B 5/14503 |
| 2024/0070251 A1 * | 2/2024 | Maizels | G06F 21/32 |
| 2024/0371242 A1 * | 11/2024 | Whittaker | F41A 35/00 |

* cited by examiner

*Primary Examiner* — Parul H Gupta
(74) *Attorney, Agent, or Firm* — Zagorin Cave LLP; Robert W. Holland

(57) ABSTRACT

A portable information handling system touchpad detects cursor inputs and finger inputs through a touch detection surface and/or a force detection surface and outputs a vibration from a haptic device when a finger input is detected. An accelerometer monitors vibrations of the haptic device generated in response to the finger input so that the vibration is adjusted to achieve a target vibration. The accelerometer filters detected vibrations to isolate the haptic device vibrations at a range around the target vibration.

20 Claims, 3 Drawing Sheets

INFORMATION HANDLING SYSTEM HAPTIC FEEDBACK CLOSED LOOP RESPONSE

BACKGROUND OF THE INVENTION

Field of the Invention

The present invention relates in general to the field of information handling system input devices, and more particularly to an information handling system haptic feedback closed loop response.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems integrate processing components, a display and a power source in a portable housing to support mobile operations. Portable information handling systems allow end users to carry a system between meetings, during travel, and between home and office locations so that an end user has access to processing capabilities while mobile. Tablet configurations typically expose a touchscreen display on a planar housing that both outputs information as visual images and accepts inputs as touches. Convertible configurations typically include multiple separate housing portions that couple to each other so that the system converts between closed and open positions. For example, a main housing portion integrates processing components, a keyboard and a touchpad, and rotationally couples with hinges to a lid housing portion that integrates a display. In clamshell configuration, the lid housing portion rotates approximately ninety degrees to a raised position above the main housing portion so that an end user can type inputs while viewing the display. After usage, convertible information handling systems rotate the lid housing portion over the main housing portion to protect the keyboard and display, thus reducing the system footprint for improved storage and mobility.

One common input device included in portable information handling systems is a touchpad. The touchpad has a capacitive touch detection surface that detects finger touches for translation into cursor movements like those of a mouse. Typically, the touchpad includes buttons at a front side that an end user can press to perform enter inputs corresponding to mouse button inputs. In some systems, the buttons are separate from the touchpad to operate independently. In other systems, the buttons are included under the touchpad so that the front portion of the touchpad is pressed down to make a button input. The advantage of a movement of a button or the touchpad surface is that the end user receives some physical feedback when a button press is completed. A disadvantage to such physical feedback is that the moveable buttons are subject to breaking. As an alternative, some systems use a touch, tap or force detection at the touchpad touch detection surface to accept a finger input. Typically, these type of touch finger inputs rely on haptic feedback to indicate completion of a finger press, such as a vibration generated by a piezoelectric device. For example, haptic actuator generates a finger click feel by vibrating the top surface based upon a specific type of touch or a specific force sensed by a force sensor.

A number of difficulties arise with haptic feedback for touch finger inputs. One difficulty is that operating conditions tend to impact haptic feedback generation, such as temperature and humidity effects on material stiffness, so that a haptic feedback may feel inconsistent over time. The inconsistency in haptic feedback feel can vary significantly across a touch detection surface, leaving an end user with doubts regarding whether a finger input was properly sensed. As an information handling system ages, these inconsistencies can be amplified by material wear and breakdown of the haptic device. Although wear can be tracked with a number of input cycles, such tracking has less utility with a non-moveable finger input device.

SUMMARY OF THE INVENTION

Therefore, a need has arisen for a system and method which manages haptic feedback through a closed loop response.

In accordance with the present invention, a system and method are provided which substantially reduce the disadvantages and problems associated with previous methods and systems that generate vibrations as haptic feedback to a touch input. An accelerometer included in a touch detection device, such as a touchpad, monitors vibrations generated by a haptic device in response to a touch input to adjust the vibrations generated by the haptic device to a target vibration.

More specifically, a portable information handling system processes information with a processor and memory disposed in a housing. A touchpad coupled to the housing detects end user inputs, such as with touches to move a cursor presented at a display and touches and/or presses made as finger inputs. When a finger input is detected, a haptic device generates vibration as feedback to an end user that the finger input was detected. An accelerometer monitors the haptic device vibrations so that the haptic device vibrations can adjust to a target vibration range. The target vibration is tuned at manufacture of an information handling system and stored in the touchpad so that a reference for the target vibration is established. The accelerometer may filter out vibrations outside of a range associated with the target vibration and may also monitor conditions before a haptic feedback is commanded so that the haptic feedback provides an expected response in view of a vibration environment at the time the haptic feedback is initiated.

The present invention provides a number of important technical advantages. One example of an important technical advantage is that haptic feedback at a touchpad or other touch detection device in response to a finger input is provided with a consistency over time as the haptic device and/or touchpad materials degrade. The haptic feedback is measured by an accelerometer to adjust in real time or at periodic intervals. Haptic feedback may also adjust based upon detected vibration conditions at the finger input, such as vibrations introduced by a cooling fan or speakers that might otherwise mask the input finger haptic response. Haptic feedback may also adjust based on significant change in environmental conditions like temperature and humidity since they can decrease or increase the intensity of haptic feedback. Another advantage is in remote diagnostics and service-if there is no haptic feedback or significantly weaker haptic feedback detected by the accelerometer after the press event, then the remote service technician can confirm that the touchpad device is faulty and needs replacement without physically requiring to check the haptic feedback. The accelerometer on the touchpad may also be used to monitor shock or device drop event when the touchpad is not in use.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A portable information handling system touchpad provides closed loop haptic feedback. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
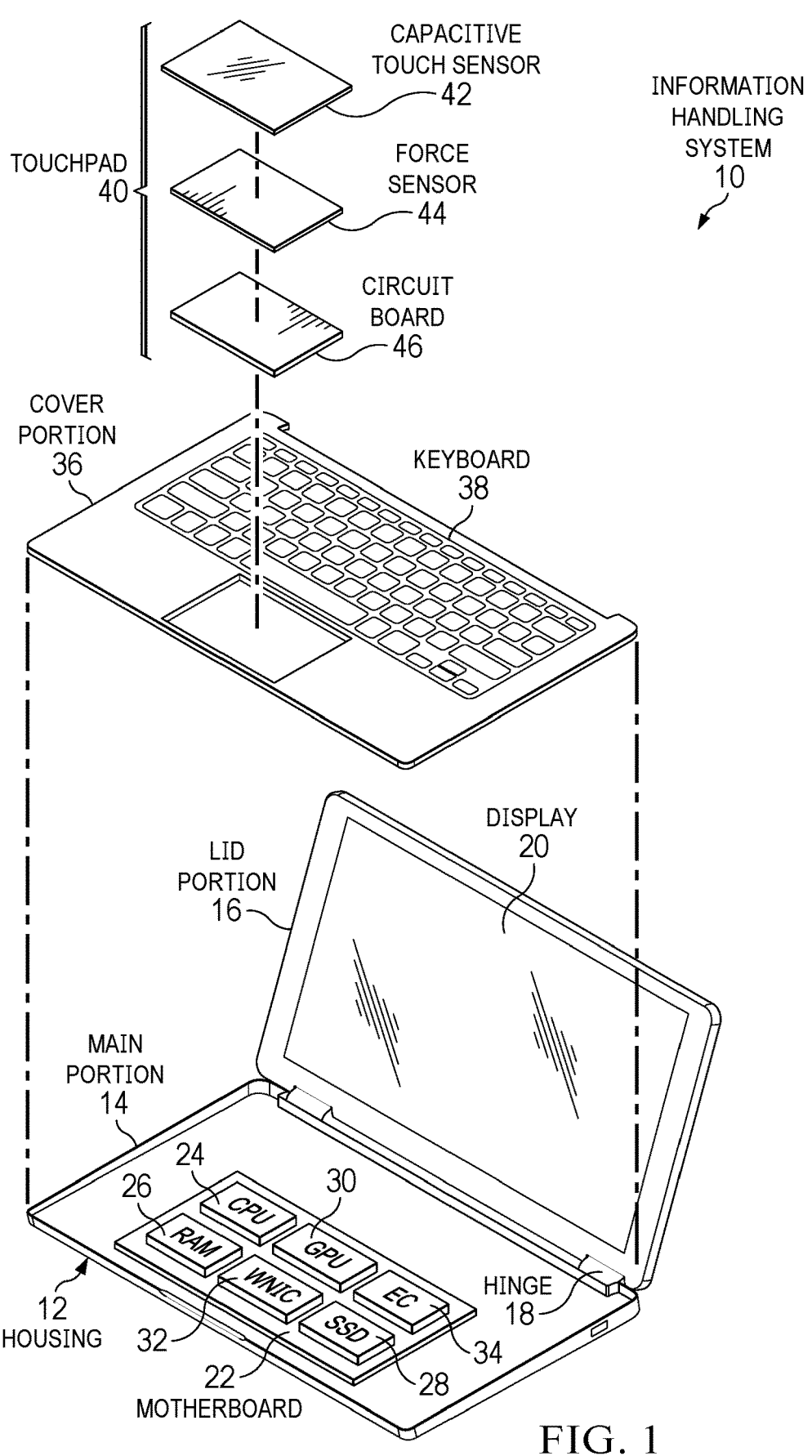
FIG. 1 depicts an exploded perspective view of a portable information handling system having a touchpad with closed loop haptic feedback.

Referring now to FIG. 1, an exploded perspective view depicts a portable information handling system 10 having a touchpad 40 with closed loop haptic feedback. Portable information handling system 10 is built in a portable housing 12 having a main portion 14 rotationally coupled to a lid portion 16 by a hinge 18. A display 20 integrates in housing lid portion 16 to present information as visual images.

Housing main portion 14 contains processing components that cooperate to process information. A motherboard 22 interfaces the processing components, such as a central processing unit (CPU) 24 that executes instructions to process information in cooperation with a random access memory (RAM) 26 that stores the instructions and information. A solid state drive (SSD) 28 has persistent storage, such as non-transitory flash memory, that stores instructions and information during power down states, such as an operating system and applications. A graphics processing unit (GPU) 30 further executes information to generate visual images for presentation by display 20, such as by defining an array of pixels. A wireless network interface controller (WNIC) 32 supports communication with external networks and devices, such as through WIFI and BLUETOOTH. An embedded controller 34 manages physical operating conditions within portable housing 12, such as application of power to run the processing components and maintenance of thermal constraints. Embedded controller 34 includes instructions stored in flash memory that manage interactions with input/output (I/O) devices, such as integrated and peripheral keyboards and pointing devices.

A housing cover portion 36 couples to housing main portion 14 to cover and protect the processing components. The upper surface of housing cover portion 36 supports a keyboard 38 having plural keys to accept typed inputs and a touchpad 40 that accepts touch inputs to position a cursor presented at display 20. When portable housing 12 rotates to an open position as shown, housing main portion 14 acts as a base that holds display 20 in lid portion 16 in a viewing position while keyboard 38 and touchpad 40 are exposed at the upper surface of cover portion 36 to accept end user inputs. Touchpad 40 has a capacitive touch sensor surface 42 that detects end user touches so that an end user can control a cursor presentation position on display 20 with finger movements, similar to mouse inputs. Touchpad 40 also includes a force detection sensor layer 44 that detects an amount of force applied at capacitive touch sensor surface 42, such as by detection pressure pressing down by a finger. Force detection sensor layer 44 detects presses by a finger as input finger presses similar to mouse button presses. The force sensing supports finger input detection without moving parts so that touchpad 40 has a fixed assembly to a bracket that assembles to the cover portion 36. A circuit board 46 includes a processing resource that processes touch and force inputs to report to CPU 24. In the example embodiment, circuit board 46 includes an accelerometer, as is detailed below, to support closed loop management of haptic feedback at touchpad 40, such as vibration of a haptic device in response to a finger input at touchpad 40. The haptic feedback is a vibration generated by a haptic device, such as piezoelectric, LRA or other haptic device, when a finger press is detected so that the end user understands that a finger press was sensed by the processing resource where physical feedback of a moving finger is not available.

Figure 2:
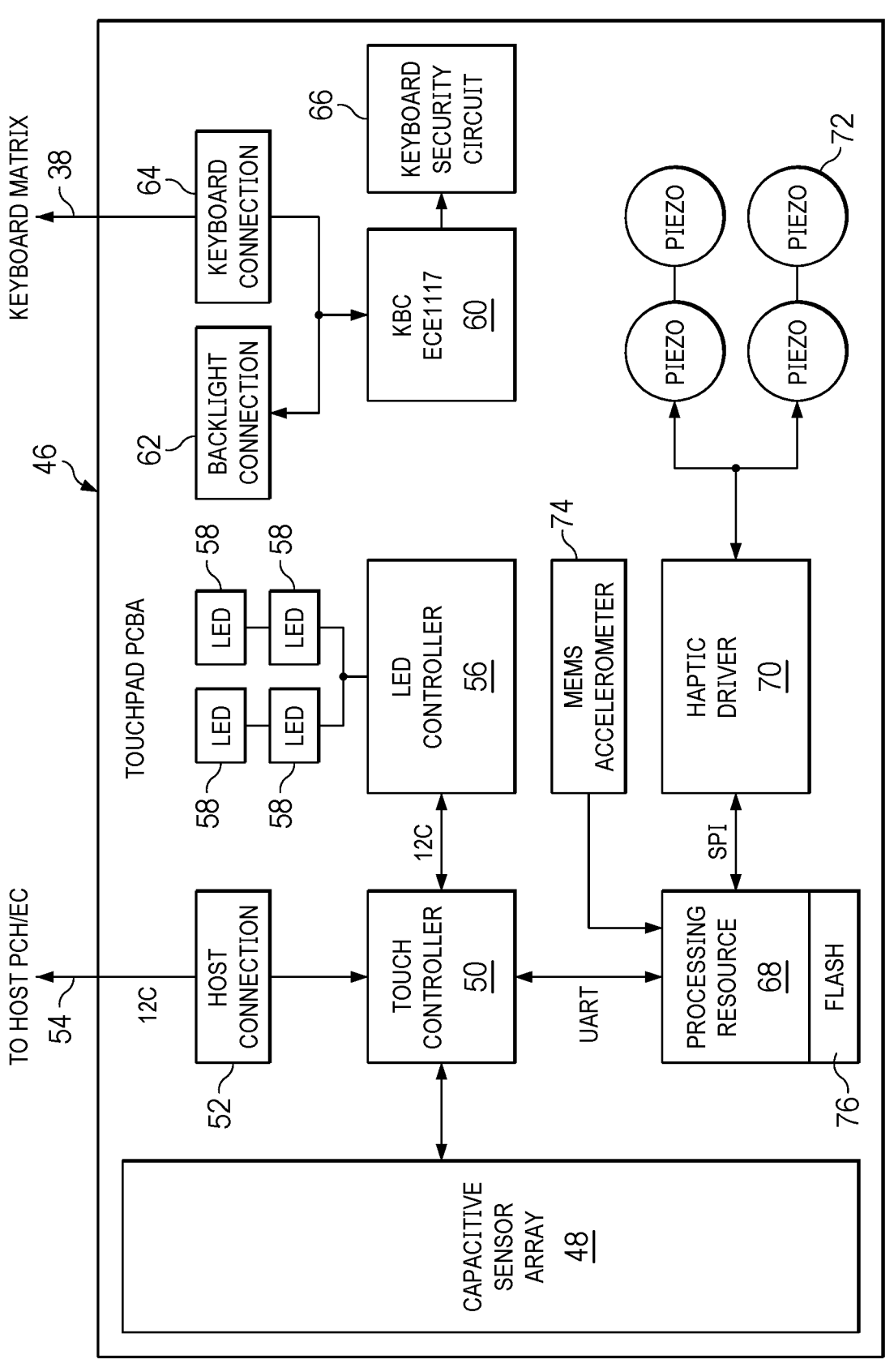
FIG. 2 depicts a block circuit diagram of a touchpad circuit board that supports closed loop haptic feedback.

Referring now to FIG. 2, a block circuit diagram depicts a touchpad circuit board 46 that supports closed loop haptic feedback. A capacitive sensor array 48 detects touch inputs in cooperation with a touch controller 50 and reports the touch inputs through a host communication link 52 to the system embedded controller and/or processor, such as through an I2C interface 54. Touch controller 50 manages illumination of LEDs 58 by a LED controller 56, such as to support backlighting of the touch detection surface. A keyboard controller 60 interfaces with keyboard 38 to receive inputs from the keyboard matrix. Keyboard controller 60 manages keyboard backlights through a backlight controller 62 and interfaces with the keyboard through a keyboard connector 64. In the example embodiment, a processing resource 68 interfaces with touch controller 50 to manage haptic feedback in response to predetermined touches, such as finger inputs. Processing resource 68, such as a micro-controller unit (MCU), communicates with a haptic driver 70 to generate vibrations as haptic feedback from haptic devices 72, such as piezoelectric devices. Instructions stored in flash 76 or other non-transitory memory executes on processing resource 68 to generate vibrations of variable frequency and amplitude that an end user will feel similar to a physical push of a button. The instructions in flash 76 adjust haptic feedback commanded by processing resource 68 by analyzing vibrations detected by an accelerometer 74 coupled to circuit board 46 with closed loop logic as detailed below.

Accelerometer 74 supports a closed loop architecture for haptic feedback and improves diagnostic capabilities of touchpads deployed to the field. The accelerometer enhances touchpad functionality by connecting directly to the haptic MCU so that all data streams of the touchpad are accessed by one processing resource to manage closed loop haptic feedback, such as force detection, touch location, the amount of haptic driving signal and output of a haptic device. Based upon this real time data stream, intelligent decisions for adjustments to haptic feedback can be made over the life of the product. For example, at manufacturer the touchpad haptic feedback is tuned to a desired amount and the accelerometer reading is stored for that amount in the flash of the processing resource. Over the life of the touch-pad periodic readings may be taken when a haptic response is made of the accelerometer and compared against the manufacture tuning to adjust the haptic driving signal so that the accelerometer reads the tuned value. Such comparisons may occur on a periodic basis, such as every day or week, or may be performed in real time for each haptic response. For instance, when an finger input is detected at the touch-pad and a haptic response is commanded, while the haptic response is performed the accelerometer reading is com-pared against the tuned reading to adjust the drive signal to achieve the tuned value from the accelerometer. The drive signal is then stored and used at the next haptic response. In the example embodiment, the accelerometer is interfaced directly with the haptic MCU, which decides the drive signal to the haptic actuators, such a piezoelectric, linear resonant actuator (LRA), direct drive actuator (DDA) or other haptic devices. A single accelerometer is surface mounted at a central location so that detected haptic feedback vibrations can be analyzed based on the location of the touch at the touchpad read by the capacitive touch sensor. In alternative embodiments with a large circuit board area, plural accel-erometers may be used and compared against each other to determine the vibrations of the haptic response.

In operation, a haptic vibration response is generated by piezoelectric haptic devices when a finger press is detected that indicates a finger input, such as a mouse click equiva-lent. Detection of the finger input may be sensed in a variety of ways, such as a pressure of a press at the force detection layer, a lift then tap and hold of a finger and a still placement of a finger at a location for predetermined time. The haptic response is commanded by the haptic processing resource with a drive signal command to the haptic driver of a stored amount, such as tuned value having a frequency and ampli-tude. When the haptic device vibrates, the vibration is read by the accelerometer and fed back to the haptic processing resource. In one embodiment, a range of acceptable responses is stored in the accelerometer so that a GPIO signal is used to indicate an acceptable haptic response. When the GPIO signal is not detected from the accelerom-eter, the values for the detected acceleration may be down-loaded to the processing resource for analysis. Alternatively, the vibration values may be provided directly to the haptic processing resource whenever a haptic response is com-manded for real time adjustments of the haptic response drive signal. For example, the accelerometer may be pow-ered down until the haptic response is commanded and then powered up to analyze the response. The response may be isolated with a filter that reads vibrations in a target range, such as less than 500 Hz. The filter may in particular seek to isolate the haptic vibrations from other common vibrations by filtering out common vibrations such as fan noise and speaker noise. In one example embodiment, a Fast Fourier Transform (FFT) is used to filter vibrations to a range expected for the haptic response. In an alternative embodi-ment, accelerometer readings are taken before the haptic response is commanded so that the haptic drive signal is adjusted for existing vibrations. For instance, when the cooling fan is running at a speed the vibrations of the cooling fan might enhance or detract from the haptic response. To ensure adequate haptic response, the haptic drive signal may slightly adjust vibration amplitude or frequency based upon the detected ambient vibrations. Measuring vibrations before the haptic response provides a base set of vibrations measurements against which a comparison can be made after the haptic response so that the difference indicates the amount of haptic response. When the haptic response fails or does not provide an expected vibration for a given drive signal, the end user may be provided with a notice to service the touchpad. Although the example embodiment is a touch-pad finger input, in alternative embodiments other types of haptic responses may be managed with closed loop response, such a virtual keyboard key press finger input at a touch screen like a tablet or similar inputs made at touch detection surfaces.

Figure 3:
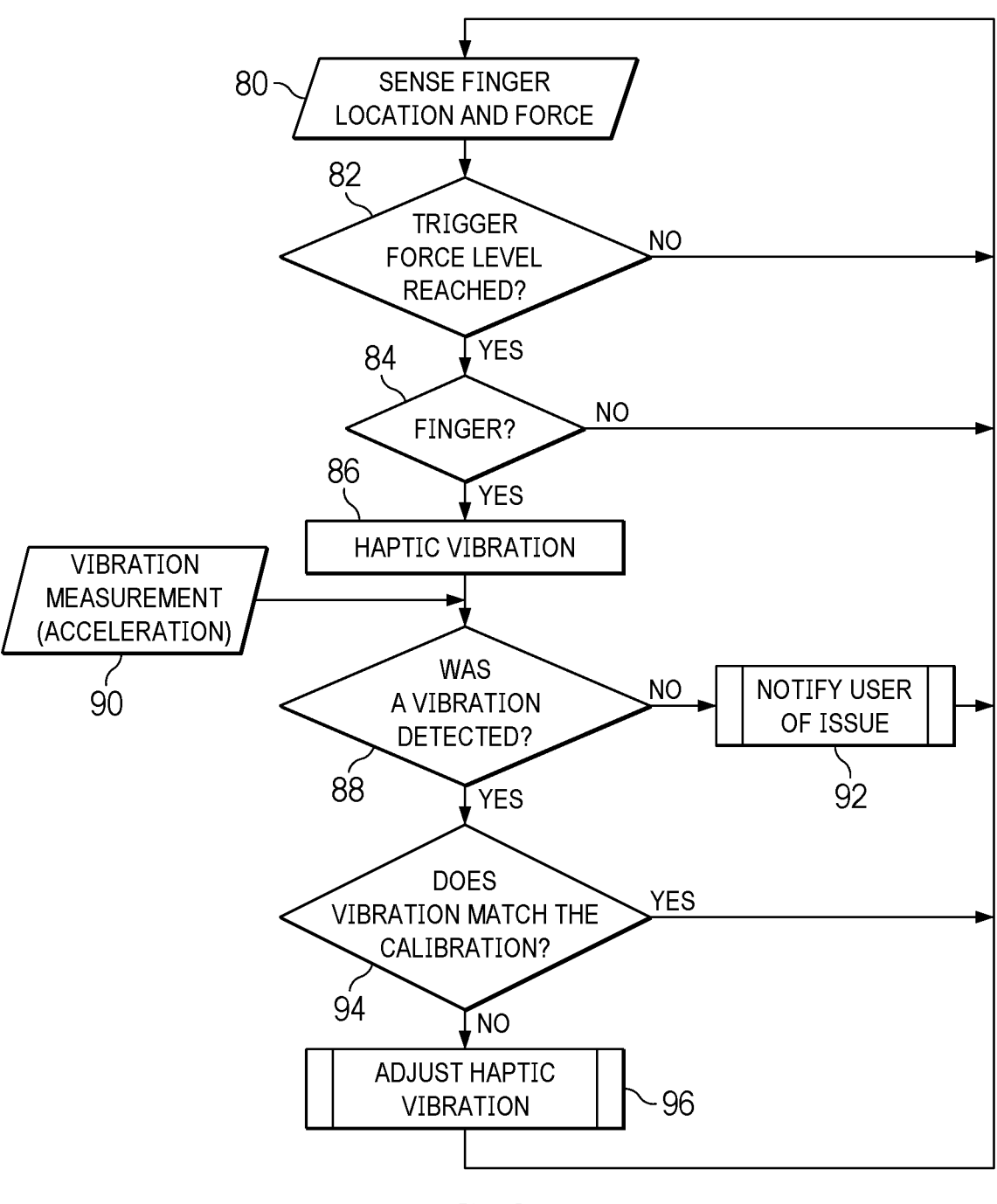
FIG. 3 depicts a flow diagram of a process for providing closed loop haptic feedback at a touchpad.

Referring now to FIG. 3, a flow diagram of a process for providing closed loop haptic feedback at a touchpad is shown. The process starts at step 80 with detection of a finger location and force at the touchpad surface, such as a capacitive touch detection and a predetermined pressure sensed by a force detection layer. At step 82 a determination is made of whether the force is a trigger level to initiate a haptic response and, if not, the process returns to step 80. If at step 82 the force is sufficient, the process continues to step 84 to determine if the force is by a finger and, if not, the process returns to step 80. If the force is generated by a finger at step 84, the process continues to step 86 for a haptic processing resource to command a haptic response by pro-viding a drive signal from a haptic device driver to a haptic device, such as a piezoelectric haptic device. At step 88 a vibration measurement by an accelerometer at step 90 is analyzed to determine if a vibration is detected. If at step 88 no vibration is detected, the process ends at step 92 with a notification to the end user of a fault condition. If at step 88 vibration is detected, the process continues to step 94 to analyze the accelerometer sensed vibrations of the haptic device at the touchpad, such as with a filter that focuses on the expected vibration response and a determination is made of whether the vibration response is in a calibration range. If the vibration response is not in range, the process con-tinues to step 96 to adjust the haptic response by changing the frequency and/or amplitude of the haptic drive signal. If the vibration is in range at step 94 the process completes the haptic response and then returns to step 80 to monitor for a finger input.

Although the present invention has been described in detail, it should be understood that various changes, substitutions and alterations can be made hereto without departing from the spirit and scope of the invention as defined by the appended claims.

What is claimed is:

1. An information handling system comprising:

a housing;

a processor coupled in the housing and operable to execute instructions that process information;

a memory coupled in the housing and interfaced with the processor, the memory operable to store the instructions and information;

a display coupled to the housing and interfaced with the processor, the display operable to present the information as visual images; and a touchpad coupled to the housing and interfaced with the processor, the touchpad having a touch detection surface, a processing resource, a non-transitory memory, a haptic device and an accelerometer, the non-transitory memory storing instructions that when executed on a processing resource causes analysis of touches to detect cursor movements and finger press inputs, command of the cursor movements to move a cursor presented at the display, command of drive signal to generate vibration from the haptic device in response to the finger press inputs, detection of vibrations from the haptic device by the accelerometer, adjustment of the drive signal of the haptic device vibrations based upon the detection of vibrations to achieve a target vibration, storing the adjusted drive signal and applying the adjusted drive signal at the next command of the drive signal to generate vibration from the haptic device.

2. The information handling system of claim 1 wherein the instructions further:

store a target vibration associated with the haptic device; and adjust the haptic device vibrations to achieve the target vibration as detected by the accelerometer.

3. The information handling system of claim 2 wherein the instructions further:

power down the accelerometer when the haptic device is not activated; and power up the accelerometer when the haptic device is activated.

4. The information handling system of claim 2 wherein the instructions include a filter that isolates accelerometer detection of vibrations to the vibration of the haptic device.

5. The information handling system of claim 4 wherein the filter comprises a fast Fourier transform.

6. The information handling system of claim 4 wherein the filter isolates out speaker noise vibrations.

7. The information handling system of claim 4 wherein the filter isolates out cooling fan noise.

8. The information handling system of claim 4 wherein the instructions further:

detect vibrations before the haptic device generates vibrations in response to the finger press inputs; and adjust the vibration commanded of the haptic device based upon the vibrations detected after the haptic device generates vibrations.

9. The information handling system of claim 4 wherein the instructions further:

detect vibrations after the haptic device generates vibrations in response to the finger press inputs; and when no vibration is detected issue a notification of a vibration out of control limits before a next finger press.

10. A method for generating haptic feedback at a touch input device, the method comprising:

detecting a finger press input at the touch input device;

in response to the detecting the finger press input, powering up the accelerometer;

in response to the detecting, activating a haptic device target drive signal to generate vibration feedback at the touch input device;

monitoring the vibration feedback with an accelerometer;

adjusting the haptic device target drive signal based upon the monitoring to generate a target vibration feedback; and storing the adjusted haptic device target drive signal as the target drive signal to use to generate the vibration feedback at the next command for haptic feedback.

11. The method of claim 10 further comprising:

tuning the haptic device at manufacture of the touch input device by monitoring vibration sensed by the accelerometer when the target vibration feedback is applied; and storing the vibration detected by the accelerometer during the tuning as the target vibration feedback.

12. The method of claim 10 further comprising:

detecting the finger press input with a force detection sensor included in a touchpad; and generating the vibration with a haptic device selected from the group of piezoelectric actuator, linear resonant actuator, and a direct drive actuator.

13. The method of claim 12 further comprising:

detecting vibrations with the accelerometer before activating the haptic device; and adjusting the target vibration feedback based upon the vibration detected before activating the haptic device.

14. The method of claim 10 further comprising filtering vibrations detected by the accelerometer to a range associated with the target vibration feedback.

15. A touchpad comprising:

a touch detection surface;

a force detection surface;

a processing resource;

a haptic device;

an accelerometer; and a non-transitory memory storing instructions that when executed on the processing resource causes:

analysis of touches to detect a cursor movement and a finger press input;

command of a cursor movement to a display in response to the touches detected for cursor movements;

detection of ambient vibrations by the accelerometer;

command of vibration from the haptic device in response to the finger press input to create a target vibration;

detection of vibrations from the haptic device by the accelerometer;

adjustment of the haptic device vibrations based upon the detection of vibrations and the ambient vibrations to create an adjusted target vibration that offsets effects of the ambient vibrations.

16. The touchpad of claim 15 wherein the instructions further:

store a target vibration detectable by the accelerometer to generate in response to the finger press input; and adjust the haptic device vibrations to detect the target vibration with the accelerometer when commanding vibration from the haptic device in response to the finger press input.

17. The touchpad of claim 16 wherein the instructions further filter accelerations detected by the accelerometer to a range around the target vibration.

18. The touchpad of claim 15 wherein the instructions further:

power down the accelerometer when the finger press input is not detected; and power up the accelerometer when the finger press input is detected and before command of the vibrations.

19. The touchpad of claim 15 wherein the instructions further:

detect vibrations with the accelerometer after activating the haptic device; and adjust the vibration generated by the haptic device based upon the vibration detected after activating the haptic device on the next finger press to generate a target vibration feedback.

20. The touchpad of claim 15 wherein the instructions further monitor accelerometer sensed accelerations for a shock event associated with a drop of the touchpad.

* * * * *